Feb. 20, 1934.　　　　F. W. DAVIS　　　　1,947,973
HYDRAULIC STEERING MECHANISM WITH REMOTE POWER UNIT
Filed March 4, 1931　　　2 Sheets-Sheet 1
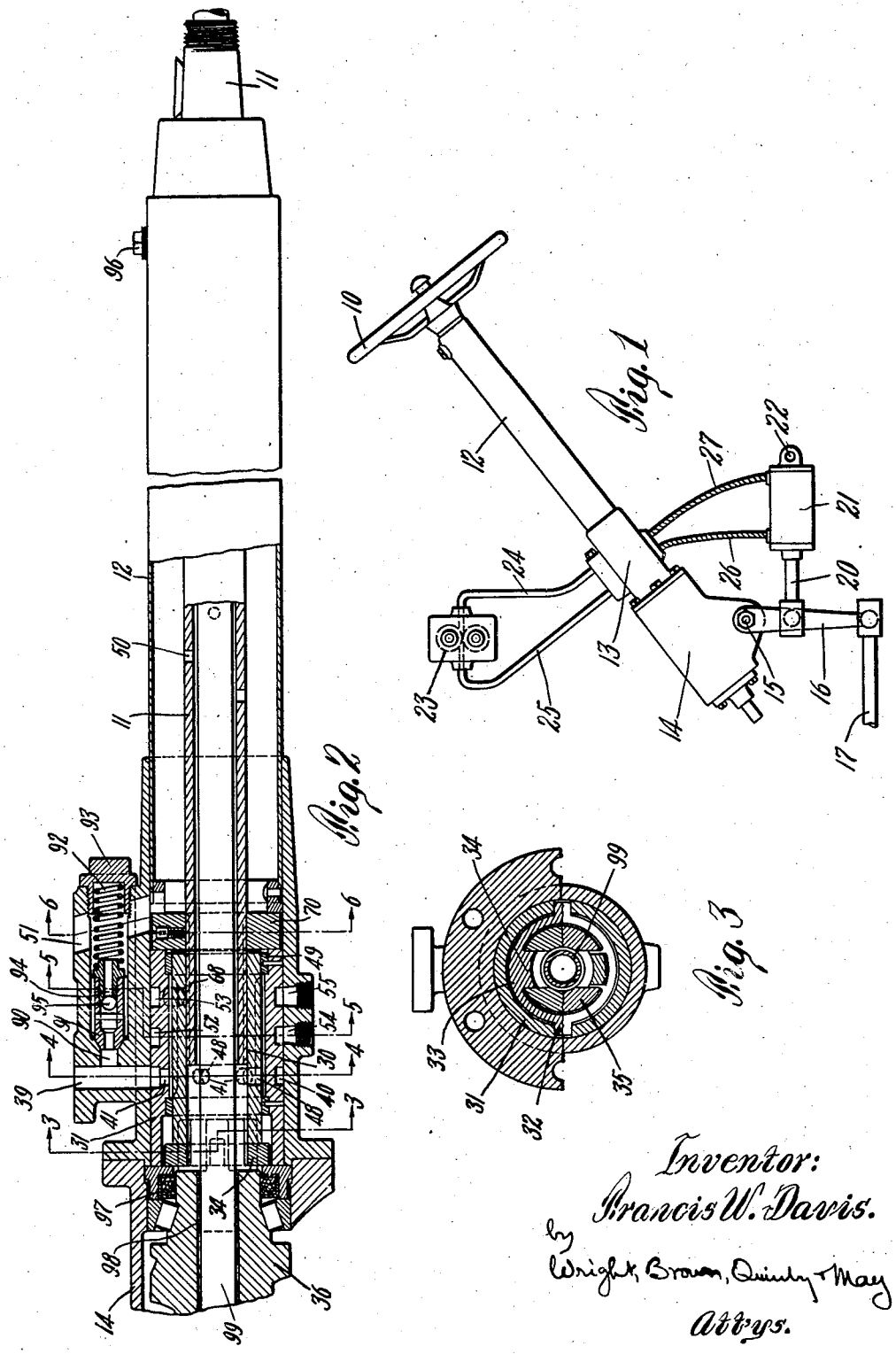
Inventor:
Francis W. Davis.
by Wright, Brown, Quinby & May
Attys.

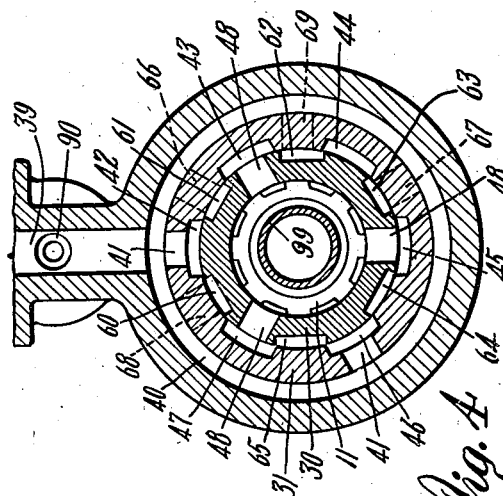

Patented Feb. 20, 1934

1,947,973

UNITED STATES PATENT OFFICE 1,947,973

HYDRAULIC STEERING MECHANISM WITH REMOTE POWER UNIT

Francis W. Davis, Waltham, Mass.

Application March 4, 1931. Serial No. 519,952

5 Claims. (Cl. 121—41)

This invention relates to steering mechanism such as is suitable for carriers, such as automobiles, aeroplanes and the like capable of being operated by hand or by fluid power when the resistance to steering effort exceeds a definite predetermined amount. This steering gear in some respects resembles that described and claimed in my Patent No. 1,790,620, granted January 27, 1931. As described in the patent, the steered part of the vehicle may be actuated by fluid pressure on a piston in a cylinder. Either the cylinder or the piston may be anchored to the vehicle frame, the other being connected directly to the steered part of the vehicle and movable by fluid pressure. An incompressible fluid such as oil or glycerine mixture is preferred. For the control of the fluid, a valve mechanism is employed consisting of a pair of relatively movable elements having grooves and passages therein which cooperate to form conduits for the oil, these conduits being variable by relative movement of the elements in such a way that the pressure conditions on opposite sides of the piston are controlled by such movement. The gear described in the patent is furthermore characterized by a connection between one of the valve elements and the steering wheel, the other valve element being actuable or substantially integral with the piston or cylinder (depending on which is movable) so as to move therewith. The grooves and passages are so arranged as to form a valve of great sensitivity, capable of reacting to a very slight relative movement between the two elements, the maximum range of relative movement being of the order of a few thousandths of an inch. This results in a very delicate and sensitive follow-up movement on the part of the piston responsive to the slightest movement of the hand movable valve member relative thereto. Since the piston is actually or substantially integral with the other valve element, this follow-up motion does not overrun as the unbalanced pressure condition which causes the movement of the piston is instantly relieved as soon as the valve member associated with the piston is restored to its neutral position relative to the hand movable element.

For some conditions of service it may be preferred to mount the power cylinder and piston at a distance from the valve elements, one of the valve elements being connected through a suitable mechanical linkage with the piston or cylinder so as to be movable thereby, the other valve member being, as before, movable by operation of the hand steering wheel. Such an arrangement may be convenient for heavy vehicles such as passenger busses or large motor trucks, since, in case of failure of the power mechanism, the entire mechanism can be quickly and easily disconnected so as not to be a drag on the steering of the vehicle by hand. Where the piston or cylinder and its associated valve member are remote and are mechanically connected instead of being substantially a unit, there is necessarily a certain amount of backlash or lost motion between the piston and its associated valve member, as well as a certain amount of unavoidable friction in the connecting joints, no matter how carefully or accurately the parts are connected. The result of such backlash and friction on a sensitive valve of the type described, as hereinafter more fully described, is to cause a violent vibration of the valve and power mechanism unless means are provided to avoid such action.

According to the present invention a dash-pot mechanism is inserted between the two relatively movable members so as to prevent undesirable oscillation thereof. The present invention, moreover, includes certain advantages and improvements in the valve mechanism itself. The valve hereinafter described in detail is capable of permitting a free, unobstructed flow of oil therethrough when the valve is in its neutral position, that is, when the piston or cylinder is not being actuated by the power fluid. At the same time the pressure chambers on the opposite sides of the piston are connected with each other so as to allow the passage of oil back and forth between them. This is necessary since the piston or cylinder must move with the steered part and must displace oil in the cylinder chambers whenever the vehicle wheels are deflected by any means such as the manual force of the operator, power actuation of the piston or cylinder, or reaction of the road directly on the vehicle wheels. The valve structure is such that when the steering resistance exceeds a certain predetermined magnitude the free flow of oil through the valve is shut off and the oil is directed into the pressure chamber on one side or the other of the piston. As the oil is directed into one pressure chamber, communication between the two chambers is cut off, and the other chamber is connected to the discharge line extending from the valve mechanism. In one embodiment of the invention, when the valve members are in their neutral position relative to each other, the stream of oil passing through the valve mechanism is closed off from the passages leading to the pressure chambers in the cylinder. When the valve elements are moved from their relative neutral position, the supply stream of oil is directed into one pressure chamber or the other. The passage or conduit connecting the chambers when the valve members are in neutral position may be suitably constricted at one or more points to serve as a dashpot to absorb in the cylinder the instantaneous force or impulse of sudden shocks transmitted from the vehicle wheels through the linkage extending to the piston. The valve elements may be easily and economically shaped by broaching grooves in the interior of one cylindrical element and milling grooves in the exterior surface of a smaller element adapted to fit snugly in the other for rotative movement therein. These longitudinal grooves in the two members coact in providing conduits from the inlet pipe to the discharge pipe and from one pressure chamber to the other.

For a more complete understanding of the invention reference may be had to the disclosure thereof in the description which follows and on the drawings, of which,—

Figure 1 is a diagrammatic view of a steering apparatus which may embody the invention.

Figure 2 is a portion of the mechanism shown in Figure 1, a part being broken away to show the working parts in section.

Figures 3, 4, 5 and 6 are sections, respectively, on the lines 3—3, 4—4, 5—5 and 6—6 of Figure 2.

Figure 7 is a sectional view similar to Figure 5, of a modified form of valve mechanism.

The steering gear may be arranged somewhat as shown in Figure 1 and may include a hand steering wheel 10 mounted on a steering post 11 which extends downwardly through a cylindrical housing 12 at the lower end of which is a valve housing 13. Below this housing is a gear case 14 containing connecting gearing of any suitable kind by which rocking movement is given to a cross shaft 15 from which depends a crank arm 16. The lower end of this arm may be connected with a reach rod or drag link 17 of an automobile. At a suitable intermediate point of the lever 16 may be connected a piston rod 20 which extends from a power piston (not shown) which is reciprocable in a cylinder 21. The latter may be rockably mounted as at 22 to the frame of the automobile. If desired, the positions of the piston and cylinder may be reversed so as to anchor the piston rod to the vehicle frame, the cylinder being connected to the crank arm 16 for the actuation thereof. A suitable pump 23 may be provided, this pump having a suction line 24 extending from the steering column 12 which may also serve as a reserve reservoir for oil, and a pressure line 25 extending from the pump to the inlet of the valve mechanism contained in the housing 13. Normally the oil is circulated through the pump 23, the conduit 25, the valve mechanism of the casing 13, and back through the suction pipe 24 to the pump again. When the valve members are relatively moved, however, the oil may be directed into the power cylinder 21 through one of two flexible connecting pipes 26, 27 which extend from the valve mechanism to the respective ends of the cylinder 21.

Referring to Figure 2, the steering shaft 11 is for the most part hollow and extends down into the valve casing 13. The valve structure itself includes two relatively movable elements 30 and 31, these elements consisting of nested hollow cylinders which are rotatable together within the housing 13 and are also rotatable relatively to each other through a small arc. The inner member 30 is secured to the lower end of the steering post 11. The outer member 31 is mechanically connected to the piston rod 20 through a suitable linkage. The lower end of the member 31 is notched to receive a pair of outwardly extending lugs 32 on an Oldham ring 33 which has a pair of inwardly extending abutments 34 fitted between the arms 35 of a forked hub portion of a worm or spiral gear 36. The latter is contained in the gear case 14 and meshes with another worm or spiral gear (not shown) which is mounted on the cross shaft 15. This shaft, as hereinbefore stated, is connected to the piston rod 20 through the crank arm 16. Thus reciprocation of the piston within the cylinder 21 results in a corresponding rotation of the valve member 31. The valve member 30, on the other hand, is manually rotated by reason of its splined connection with the steering post 11, as shown in Figure 5. The grooves and ports in the members 30 and 31, which cooperate to form conduits for either permitting the oil to flow idly through the valve mechanism or directing the oil flow into one end or the other of the cylinder 21, are illustrated in Figures 4 and 5 as well as in Figure 2. The oil enters through the inlet 39 of the valve, this inlet communicating directly with an annular groove 40 in the outer surface of the valve member 31. From the groove 40 two ports 41 extend through the wall of the member 31. The inner wall of the member 31 is grooved longitudinally as at 42, 43, 44, 45, 46 and 47, these grooves being laterally spaced from each other by lands of approximately the same width as the grooves. The ports 41 open into the grooves 42 and 46 respectively. The grooves 43, 45 and 47 are respectively opposite to three ports 48 which extend through the wall of the valve member 30 to the interior thereof at a point below the lower end of the steering post 11. Since the steering post is hollow, oil which flows inwardly through the ports 48 may flow up through the interior of the steering post 11 to a number of lateral ports 50 through which it may escape into the interior of the steering column 12. This column is directly connected by a discharge outlet 51 to the suction pipe 24. Thus the ports 48 are discharge ports since they are always connected through the steering post 11 and the steering column 12 to the suction end of the pump. The longitudinal grooves in the inner surface of the valve element 31 may conveniently and economically be broached. The ends of these grooves may be closed as by a pair of collars 49 pinned or otherwise secured on the element 31 so as to fit tightly against shoulders thereon.

In addition to the circular groove 40 in the outer wall of the valve member 31, two other similar grooves 52 and 53 are provided, the groove 52 communicating through an outlet 54 with the flexible pipe 26 which leads to one end of the cylinder 21. The groove 53 communicates through an outlet 55 with the flexible pipe 27 which leads to the opposite end of the cylinder 21. In the outer wall of the inner valve member 30, a series of six longitudinal grooves 60, 61, 62, 63, 64 and 65, is provided, these grooves preferably terminating short of the collars 49, as indicated in Figure 2, and being laterally spaced by lands of approximately the same width as the grooves. These grooves alternate with the longitudinal grooves on the inner wall of the member 31, the grooves of the member 30 registering approximately with the lands of the member 31, and the grooves of the member 31 registering approximately with the lands of the member 30. As shown in Figure 5, the grooves 61 and 63 communicate as by ports 66 and 67 through the member 31 with the circular groove 52 which, in turn, communicates with the cylinder 21 through the flexible pipe 26. In like manner the grooves 60 and 62 communicate with the cylinder 21 through the pipe 27, these grooves being connected by similar ports 68 and 69 with the circular groove 53. The horizontal grooves in the inner surface of the member 31 alternate with the grooves in the outer surface of the member 30, the grooves in each member being opposite corresponding lands of the other member. As shown in Figure 4, the edges of some adjacent lands overlap while others do not, when the valve members are in their neutral position. The actual amounts of clearance and overlap are slight, these being greatly exaggerated on the drawings so as to illustrate more clearly the operation of the valve. When the valve members 30 and 31 are in their neutral relation position, as illustrated in Figures 4 and 5, the supply of oil which enters through the inlet 39 into the circular groove 40 flows into the groove 46 through the lower port 41. The upper port 41 connects with the groove 42 which is shut off from the grooves 60 and 61. From the groove 46 the oil flows through the grooves 64 and 45 to one of the outlet ports 48, and also through the grooves 65 and 47 to another outlet port 48, so that when the valve members 30 and 31 are in their neutral relative position there is a free, unobstructed flow of oil through the valve mechanism and back to the suction line of the pump, but the pressure chambers in the cylinder are cut off from the supply and discharge pipes. Communication between the two chambers in the cylinder 21, when the valve members are in their relatively neutral position, is a practical necessity as otherwise the incompressible fluid completely filling the chambers with no way of escape would positively prevent movement of the piston until the valve member was moved to open passages for ingress and egress of oil. In the operation of the steering gear, it is desirable that the gear be operated manually without the assistance of power means unless and until road resistance to steering effort is sufficient to compress one of a pair of springs 73 hereinafter described, that is, it is desirable that the piston in the cylinder 21 be manually movable while the valve members remain in their relative neutral position. This would be impossible if no way of escape were provided for the oil. Furthermore, if the oil were trapped in the pressure chambers, no movement of the piston in response to road shocks would be possible. This would entail severe shock stresses in the linkage connecting the vehicle wheels with the piston. Communication between the chambers in the cylinder 21, when the valve members are in neutral position, is provided through the groove 44 which is made wide enough to connect simultaneously with the grooves 62 and 63, these being respectively connected at all times with the pressure chambers in the cylinder 21. The two pressure chambers in the cylinder are thus in constant communication with each other while the valve members are in their relatively neutral position so that the manual operation of the steering gear is not obstructed by any trapping of oil in either end of the cylinder. The clearances between the grooves 62, 63 and the adjacent groove 44 may be made very narrow so as to provide a dash-pot action to absorb road shocks to some extent, as hereinafter explained in more detail.

When the valve is operated to call the power mechanism into play, its operation is as follows. If the steering post 11 is rotated so as to steer the vehicle to the right, the inner member 30, as shown in Figures 4 and 5, is rotated counterclockwise. This movement opens passage between the grooves 42 and 61. As the groove 42 is always connected with the inlet 39, and the groove 61 is always connected with the groove 52 and hence with one of the pressure chambers in the cylinder 21, the supply stream of oil is directed into one end of the cylinder to push the piston in a direction to deflect the forward vehicle wheels to the right. At the same time the normal path of flow of the oil through the valve is cut off by the closing of the clearances between the grooves 46 and 64, and between the grooves 65 and 47. The passage between the cylinder members is also cut off by the closing of the clearance between the grooves 62 and 44, while the groove 60, which is always in communication with the groove 53 and hence with a cylinder chamber, is connected through the groove 47 with a discharge outlet 48. Thus the effect of the movement of the member 30 is to direct the oil stream into one chamber of the cylinder 21, connect the other chamber with the discharge line, and close the connecting passage between the two chambers. Resultant motion of the piston rocks the crank arm 16 and acts through the gear connection in the casing 14 to rotate the valve member 31 in a direction following the original movement of the member 30 so as to restore the usual neutral relative position of the valve members.

Rotation of the steering wheel in the other direction causes a similar but opposite action of the valve, the oil stream being directed into the groove 60, and thence through the port 68 into the groove 53.

It is apparent that the power fluid may be directed into the cylinder by movement of either valve member relatively to the other. Hence an external deflecting force, such as may be caused by an obstruction on the road, acting on the vehicle wheels, tends to move the piston and also to rotate the valve member 31. If the valve member 30 is held stationary, resulting relative movement between the valve members directs the oil flow in a manner tending to oppose the action of the deflecting force. Thus road shocks may be partly or wholly absorbed by the oil so that little or none of the force is transmitted to the steering wheel, the shock being taken partly by the oil pump through the sudden rise in the pressure of the oil, and partly by the cylinder and valve mechanism. The pump may be largely relieved from stresses arising from sudden road shocks or impulses by making the clearances between the grooves 62, 44 and 63 relatively small when the valve members are in their neutral position. A road shock on the vehicle wheel tends to move the piston. As the cylinder is kept full of incompressible oil, any movement of the piston must be accompanied by a flow out of one of the chambers.

It takes an appreciable interval of time to squeeze even a relatively small quantity of oil through a small aperture, so that the instantaneous force or impulse resulting from a sudden road shock is largely absorbed by the cylinder and piston through the dash-pot action of the constricted passage connecting the chambers. If the external deflecting force is of longer duration than an instantaneous impulse, the valve member 31 will move to direct the oil flow into the cylinder 21 to oppose the motion of the piston impressed by the external force. Thus a momentary shock will be largely absorbed by the piston and cylinder, whereas a more prolonged deflecting force such as may be caused by soft sand or a rut, is absorbed by the pump and oil. The connecting passage between the cylinder chambers not only acts as a dashpot, but also permits hand steering of the vehicle.

Ordinarily it is desirable to steer a vehicle such as an automobile manually, reserving the power actuation for the overcoming of steering resistance which exceeds a predetermined amount. Hand steering for ordinary guiding of the vehicle on a road is desirable in that the operator can keep in touch with the guidance of the vehicle by the sense of "feel". Moreover, the vehicle can be more steadily guided since there is almost always a deflecting force acting on the vehicle due to the camber of the road, wind pressure, and other causes. By steering against this deflecting force, the backlash inevitably present in the linkage connecting the steering wheel with the vehicle wheel is taken up so that the vehicle can be held on a steady course and does not wobble or "float". When conditions are such as to cause floating steering, this gives an undesirable sense of insecurity to the operator.

In order to cause the steering mechanism to act as a hand steering gear until steering resistance reaches a certain predetermined amount, relative movement between the two valve members 30 and 31 is resisted by a suitable spring mechanism such as that illustrated in Figure 6. As shown in Figures 2 and 6, a heavy collar 70 may be mounted on the steering post 11 and may be secured against rotation relatively thereto as by a pair of pins 71. This collar is cut away at diametrical points to receive a pair of arms or prongs 72 extending upwardly from the upper end of the valve member 31, and preferably integral therewith. A pair of springs 73 may be set in recesses 78 in the collar 70, as shown in Figure 6. Each spring may be compressed by a button 74 having a flange 75 adjacent to the spring. The button is held inwardly against a spring as by a threaded collar 76 which rests against the flange 75. The opposite end of the button rests against one of the prongs 72 of the valve member 31. The buttons 74 thrust in directions approximately tangential to the rotative movement of the valve member 31 and are directed oppositely, so that each button, with the spring 73 behind it, resiliently opposes rotative motion of the valve member 31 in one direction or the other relative to the valve member 30. The threaded collars 76 are preferably adjusted so that when the two buttons 74 are abutting the respective prongs 72, the flanges 75 are resting against the ends of their respective collars 76. Thus when the valve members are in their normal relative position, the spring pressed buttons 74 are in contact with but do not impose any appreciable pressure against the prongs 72. Thus when either valve member is rotated relatively to the other, this rotative motion is opposed by the full compressive force of one of the springs 73, such rotation not being assisted at all by the other spring, since it is held back by the engagement of the adjacent flange 75 with the adjacent collar 76. Thus before power fluid can be brought into play in steering the vehicle, the steering resistance must be of sufficient magnitude to overcome the compressive force of one of the springs 73. These springs thus tend at all times to keep the valve members centered in their neutral relative position. As long as the steering resistance is not excessive, the valve members 30, 31 move substantially as a rigid unit and the steering gear as a whole is to all intents and purposes a hand steering gear. As soon, however, as steering resistance is sufficient to overcome one of the springs 73, the power of the pressure fluid is automatically called into play to assist the manual effort of the operator in deflecting the vehicle wheels. Thus small road shocks and road reactions are transmitted partly or wholly through the gear to the operator who thus is able to steer successfully by "feel" as well as by vision.

As indicated in Figure 1, the power piston is located at a point more or less remote from the controlling valve and is connected to one of the valve members by a mechanical linkage which, as a practical matter, can never be entirely free from a certain amount of backlash and friction. If the mechanism thus far described is put into operation with the supply of oil circulating from the pump 23, the following action on the part of the mechanism will result when the valve is first opened to bring the power mechanism into play. If, for example, the valve member 30 is rotated so as to connect the groove 42 with the groove 61, pressure is built up in one end of the cylinder 21. During the initial building up of this pressure, there is a certain amount of frictional resistance in the various members connecting the piston with the valve member 31 and there is also a certain amount of lost motion between the piston and the valve member 31, so that during the initial building up of pressure in the cylinder 21, there is no corresponding movement of the valve member 31. By the time sufficient pressure is built up in the cylinder to overcome the friction and take up the slack between the connecting parts so as to cause movement of the valve member 31, the pressure is excessive for the purpose and the member 31 is not only moved to its neutral position relative to the member 30 but is also moved beyond the neutral position, thus connecting the groove 42 with the groove 60 and hence with the other end of the cylinder 21. This causes a similar effect in the opposite direction which is repeated indefinitely so that the result on the apparatus as a whole is a violent and rapid oscillation of the valve mechanism and the entire steering gear which is harmful to the gear and which makes steering impossible.

In order to counteract the effect of friction and backlash in the mechanical linkage between the power piston and the valve member 31, I have provided a dash-pot mechanism such as is illustrated in Figure 6. The collar 70 may be provided with a pair of recesses to receive a pair of hollow plungers 80 each of which contains a suitable spring 81. These plungers are closely but slidably fitted in their respective recesses and bear, respectively, against the prongs 72 so that relative motion between the valve members 30 and 31 is impossible without displacement of one or both of the plungers 80. Each of these recesses is provided with a small outlet 82 at the end remote from the closed end of the plunger 80, these outlets being connected by a suitable clearance around the shank of a screw 83 which is set into the collar 70. The dash-pots are vented by a small groove 84 in the side of the screw-head. These dash-pots throttle any rapid movement between the two members and permit the successful use of a steering gear as described and illustrated.

As shown in Figure 2, a spring-pressed relief valve is provided between the inlet 39 and the outlet 51 so as to relieve excessive pressures which may be built up in the inlet 39, by reason of excessive resistance to operation of the piston. The inlet 39 and the outlet 51 may be connected as by a by-pass 90 which is usually closed by a valve 91 pressed against its seat by a suitable spring 92. This spring may be held in place by a threaded cap 93 by which also the compressive force of the spring may be adjusted so as to set the valve to operate at any desired critical pressure. The valve 91 may be provided with a central passage 94 and normally closed by a ball 95 which serves as a one-way check valve preventing flow through the passage 94 from the inlet 39 to the outlet 51. This check valve 95, however, opens at once to relieve any pressure in the outlet 51 in excess of the pressure in the inlet 39. Hence if the pump 23 is not operating, and the vehicle is being steered manually, reciprocating motion of the piston in the cylinder 21, which tends to pump oil around the circuit in its normal direction of flow also tends to create suction in the inlet 39 if the pump 23 is of such a type as to prevent flow of liquid therethrough unless it is in operation. This suction in the outlet 39 is instantly relieved by the check valve 95 so that substantially no resistance is offered to the pumping action of the piston when the gear is manually operated.

As hereinbefore described, the steering column 12 is made with sufficient diameter to contain a suitable reserve supply of oil to make good any leakage which may occur from the system. Additional oil may be readily supplied as through a filling opening normally closed by a plug 96. The lower end of the oil reservoir which includes the steering column 12 and the interior of the steering post 11 and valve member 31 may be closed off as by a suitable packing 97 around the axle portion of the gear 36, and a packing 98 between the inner wall of the gear and the outer wall of the sector tube 99 which extends down through the center of the steering post 11 for throttle and spark controls, etc.

A modified form of valve is illustrated in Figure 7 this figure being a sectional view equivalent to Figure 5, but showing a different relation between the grooves and ports in the two valve members. In other respects, the structure may be identical with that shown in Figure 5. As shown, the valve structure may comprise an inner cylindrical member 300 and an outer member 310 rotatably fitted thereon. The inner member 300 may be mounted on the lower end of the steering post 11, the outer member 310 being connected to the power piston. The outer member may have external annular grooves 40, 52 and 53, the groove 40 communicating through three ports 41 with three internal longitudinal grooves 42. In addition to these longitudinal grooves, similar grooves 43, 45, 47 may be provided in the inner surface of the member 310, alternating with the grooves 42. In the outer surface of the member 300 I may provide three longitudinal grooves 60 and three grooves 61, these grooves alternating with each other and being opposite the lands between the grooves inside the member 310. Three ports 66 through the wall of the member 310 connect the groove 53 respectively with the grooves 61. Three ports 68 in like manner connect the groove 52 respectively with the grooves 60. When the members 300 and 310 are in their neutral relative position, as illustrated in Figure 7, these longitudinal slots in the members open into each other serially around the periphery of the member 300 by overlapping along their side edges so that several paths or conduits from the inlet 39 to the interior of the member 300 are provided for the oil passing through the valve. Thus the stream of oil entering the inlet 39 and the groove 40 flows through the three ports 41 into the grooves 42. From each of the latter, the oil flow divides into the adjacent grooves, one branch flowing into one of the three grooves 60 connected with one of the chambers in the cylinder 21, the other branch flowing into one of the three grooves 61 connected with the other chamber in the cylinder 21. These branch streams flow thence through one or another of the three ports 48 into the interior of the member 300 and up through the steering post 11. It is apparent from Figure 7 that a slight rotation of either valve member relative to the other will close partly or wholly some of the clearances caused by overlap of adjacent grooves in the valve members and will at the same time open the rest of these clearances wider. The grooves are so arranged that if, for example, the member 300 is rotated in a clockwise direction through a small angle the supply grooves 42 are cut off partly or wholly from the grooves 61, and the connecting clearances between the grooves 61 and the discharge grooves 43, 45, 47 are increased. Furthermore, the clearances between the supply grooves 42 and the grooves 60 are enlarged, and these latter are cut off from the discharge grooves 43, 45, 47. Thus pressure is built up in one of the chambers while the escape of oil from the other chamber is facilitated. Since by the arrangement of grooves shown in Figure 7 there are normally three conduits connecting each chamber of the cylinder 21 with the supply port 39, and three conduits connecting each of these chambers with the discharge passage within the post 11, all twelve of which conduits are simultaneously affected by relative movement between the members 300 and 310, the valve may be made extremely sensitive without unduly throttling the normal free flow of oil therethrough.

I claim:

1. A valve including a pair of hollow nested cylindrical elements capable of limited relative rotation, the outer element having longitudinal grooves in its inner surface, the inner element having longitudinal grooves in its outer surface, each of said elements also having ports through its wall communicating with certain of said grooves, said ports and grooves forming a plurality of conduits from the exterior of the outer element to the interior of the inner element, the cross sections of said conduits being variable by alteration of the angular relation between said elements.

2. A valve including a pair of elongated hollow nested cylindrical elements capable of limited relative rotation, the inner of said elements having a series of alternate longitudinal grooves and lands in the outer surface thereof, the outer of said elements having a series of alternate longitudinal grooves and lands in the inner surface thereof and arranged to register approximately with the lands and grooves of the inner element whereby relative rotative movement of said elements opens, varies or cuts off communication between certain of the grooves of one element and adjacent grooves of the other element, each of said elements having ports through the wall thereof communicating with certain of said grooves, the ports and grooves forming a plurality of conduits variable by change in angular relation between said elements.

3. In follow-up mechanism for a power steering gear, a valve comprising two members relatively movable a limited amount from an intermediate neutral position, said valve having a fluid inlet, an outlet, and ducts leading to opposed pressure chambers, said valve also having a passage from the inlet to the outlet, and a separate passage connecting said ducts, both passages being open when the members are in neutral relative position, said grooves being arranged so that relative rotative movement of said members from their neutral position simultaneously closes said passages, connects said inlet to one of said ducts, and connects said outlet to the other of said ducts.

4. A valve comprising a pair of nested hollow cylinders, one fitted within the other and rotatable thereon through a limited angle in either direction from a normal relative position, a cylindrical member rigidly attached to and coaxial with one of said cylinders, said member having a notch in its periphery, a projection on an end of the other said cylinder extending into said notch, and a spring-pressed element mounted in said member and engaging said projection laterally to oppose relative rotation between said cylinders.

5. A valve comprising a pair of nested hollow cylinders, one fitted within the other and rotatable thereon through a limited angle in either direction from a normal relative position, a cylindrical member rigidly attached to and coaxial with one of said cylinders, said member having a pair of notches in its periphery, a pair of projections on an end of the other said cylinder extending into said notches, and a pair of spring pressed plungers mounted in said member and respectively engaging said projections laterally to oppose relative rotation in either direction between said cylinders.

FRANCIS W. DAVIS.